United States Patent [19]

Horiuchi

[11] Patent Number: 5,280,372
[45] Date of Patent: Jan. 18, 1994

[54] LIQUID CRYSTAL DISPLAY DEVICE
[75] Inventor: Kenji Horiuchi, Osaka, Japan
[73] Assignee: Sharp Kabushiki Kaisha, Osaka, Japan
[21] Appl. No.: 939,826
[22] Filed: Sep. 3, 1992
[30] Foreign Application Priority Data Aug. 3, 1992 [JP] Japan .................. 4-206460

[51] Int. Cl.[5] .............................................. G02F 1/12
[52] U.S. Cl. ........................................ 359/49; 359/50; 345/102
[58] Field of Search ................... 340/781, 782, 784; 359/48, 49, 50

[56] References Cited

U.S. PATENT DOCUMENTS

| | | | |
|---|---|---|---|
| 4,562,478 | 12/1985 | Hirasawa et al. | 340/784 |
| 4,664,481 | 5/1987 | Ito et al. | 359/50 |
| 4,826,294 | 5/1989 | Imoto | 359/49 |
| 4,909,604 | 3/1990 | Kobayashi et al. | 359/49 |
| 4,958,911 | 9/1990 | Beiswenger et al. | 359/48 |
| 5,030,943 | 7/1991 | Anglin | 340/781 |
| 5,147,127 | 9/1992 | Honda et al. | 359/50 |

FOREIGN PATENT DOCUMENTS 1-209477 9/1989 Japan .

Primary Examiner—Alvin E. Oberley
Assistant Examiner—Gin Goon
Attorney, Agent, or Firm—David G. Conlin; George W. Neuner

[57] ABSTRACT

A liquid crystal display device with a built-in back light device for illuminating a liquid crystal element. The back light device includes a light transmitting plate disposed behind the liquid crystal element, a light source disposed in the vicinity of one end of the light transmitting plate, a reflector for reflecting light from the light source towards the light transmitting plate, the reflector being integrated to the light source, and a slide mechanism for allowing the reflector to be slidably detached from the light transmitting plate.

5 Claims, 5 Drawing Sheets

LIQUID CRYSTAL DISPLAY DEVICE

BACKGROUND OF THE INVENTION

1. Field of the Invention

The present invention relates to a liquid crystal display device used in a word processor, personal computer and the like.

2. Description of the Related Art

FIG. 5 is a cross-sectional view of a prior liquid crystal display device (hereinafter, referred to as LCD device). There are shown a light source 2, a lead wire 3 for supplying electric power to the light source 2, a liquid crystal element 4, a circuit board 5, a supporting frame 6, a light transmitting substance 7, and a reflection sheet 8.

As shown in FIG. 5, a structure for reflecting a light from the light source 2 is composed of the reflection sheet 8 having high reflectivity and the frame 6 supporting the reflection sheet 8.

In the prior LCD device having such construction, it requires a complicated working process to assemble a back light device within the LCD device, and the reflection sheet 8 and the frame 6 must be detached to exchange the light source 2, which requires a laborious work. Further, since the frame 6 is made of plates of steel or aluminum mainly, it is difficult to provide a mechanism for holding the lead wire 3, therefore, the lead wire 3 becomes an obstacle to a work for exchanging the light source 2.

SUMMARY OF THE INVENTION

The object of the present invention is to provide a compact LCD device which is easy to assemble and easy to exchange a built-in light source.

To achieve the object, a back light device built in the LCD device of the present invention comprises a light transmitting plate disposed behind a liquid crystal element, a light source disposed in the vicinity of one end of the light transmitting plate, a reflector for reflecting light from the light source towards the light transmitting plate, the reflector being integrated to the light source, and a slide mechanism for allowing the reflector to be slidably detached from the light source.

In the LCD device according to the present invention, since the light source is integrated to the reflector, and the reflector is easily detached from the light transmitting plate by the slide mechanism, it is easy to assemble a back light device in the LCD device and it is easy to exchange the light source.

If the reflector is provided with a lead wire holding mechanism, the lead wire will not become an obstacle to the replacing work of the light source, and the LCD device can be made compact.

Further objects and advantages of the present invention will be apparent from the following description of the preferred embodiment of the invention as illustrated in the accompanying drawings.

DESCRIPTION OF THE PREFERRED EMBODIMENT

Figure 1:
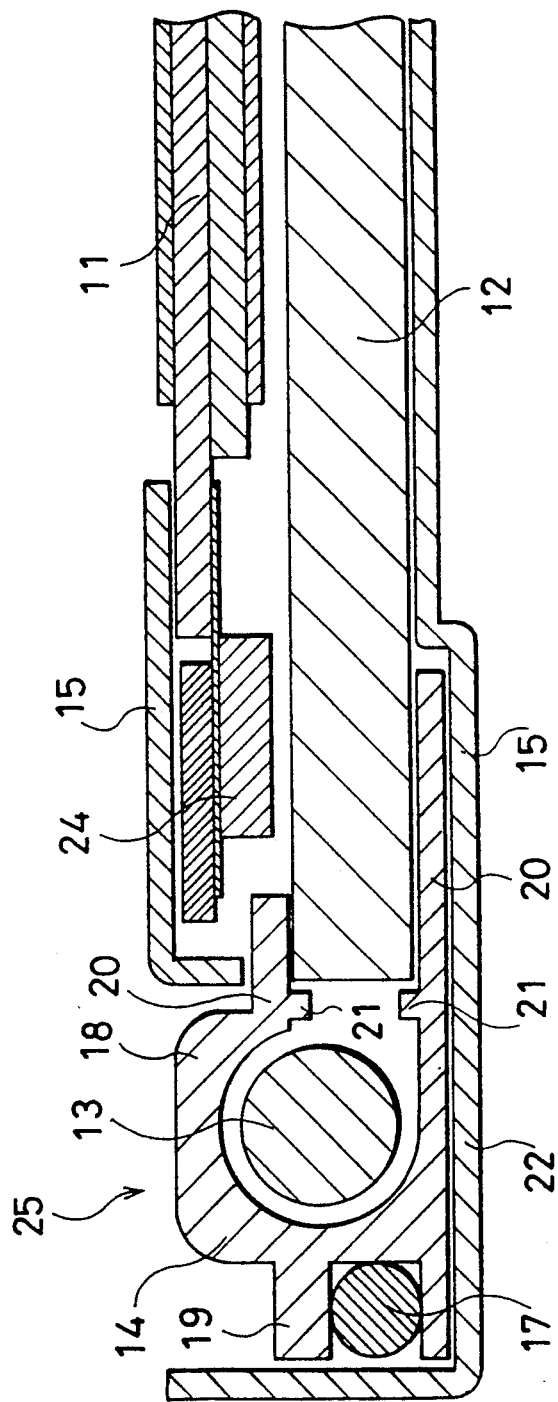
FIG. 1 is a cross-sectional view of an LCD device of an embodiment according to the invention.
Figure 2A:
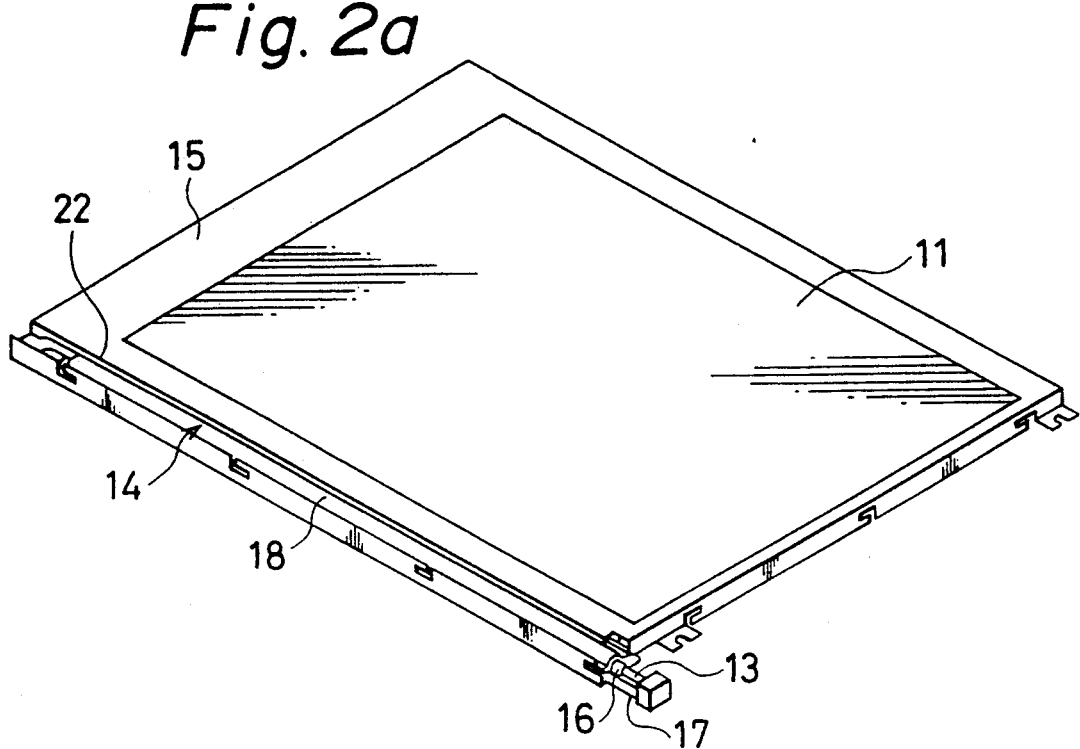
FIGS. 2a, and 2b are perspective views of the LCD device of FIG. 1.
Figure 2B:
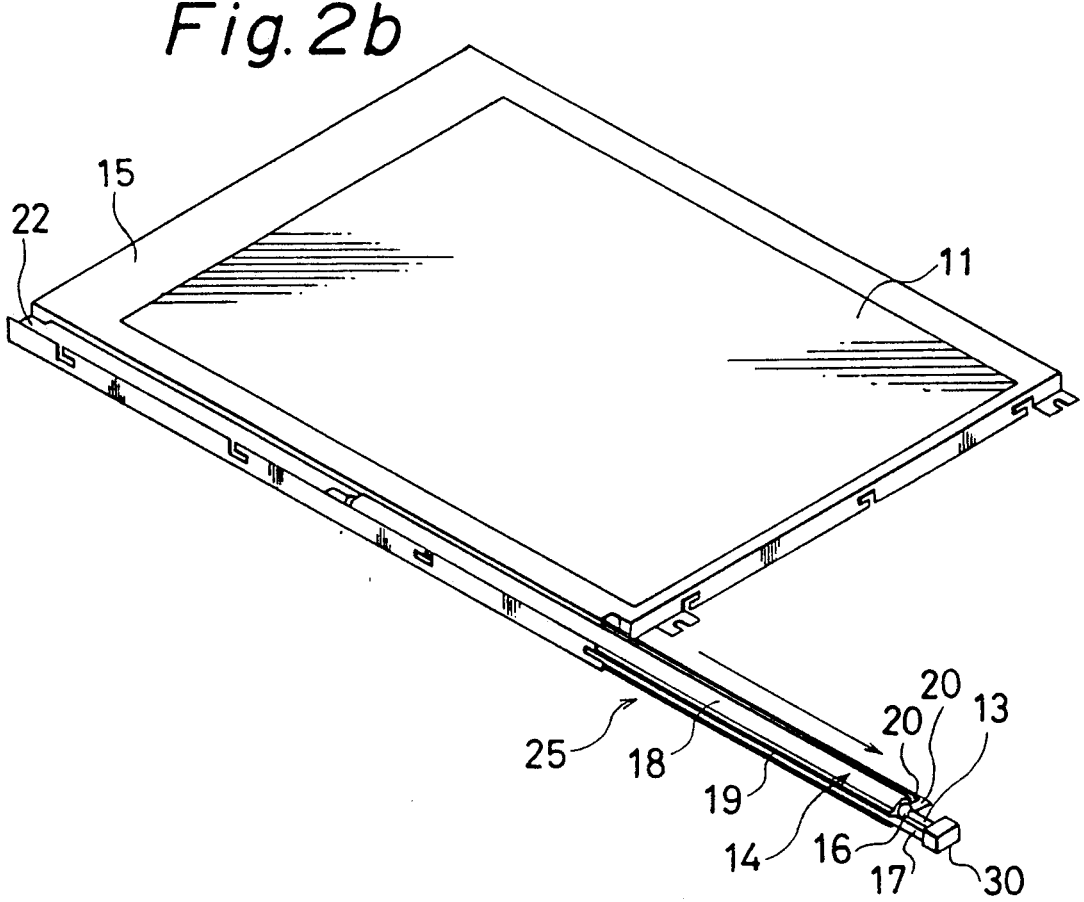

FIG. 1 is a cross-sectional view of an LCD device of an embodiment of the invention, and FIGS. 2a and 2b are perspective views of the LCD device of FIG. 1.

The LCD device of this embodiment has a back light device for illuminating a liquid crystal element 11. The back light device is composed of a light transmitting plate 12 disposed behind and in parallel with the element 11, a light source 13 disposed in the vicinity of one end of the light transmitting plate 12, a reflector 14 for reflecting light emitted from the light source 13 towards the light transmitting plate 12, and a frame 15 for supporting these components.

The light transmitting plate 12 is made of acrylyl having high transparence, and it has wider surface area than the element 11. As the light source 13, a cold cathode tube (CCFT) may be used. Both ends of the light source 13 are protected by a resinous protection member. A lead wire for supplying electric power to the light source 13 is connected to a connector 30 disposed beside one end of the light source 13.

The reflector 14 is formed by molding resinous material of high reflectivity with an extruder, and its inner surface has a circular configuration. The reflector 14 is provided with a light source holding member 18 for holding the light source 13 integrally, a lead wire holding member 19 for holding the lead wire 17 and a light transmitting plate holding member 20 which holds both ends of the plate 12.

The inner surface of the light source holding member 18 has a circular configuration having a diameter nearly equal to that of the light source 13, and is made open at the side of the light transmitting plate 12.

The lead wire holding member 19 includes a groove in which the lead wire 17 is fitted, and is disposed opposite to the plate 12.

The light transmitting plate holding member 20 includes a pair of holding pieces extending from the light source holding member 18, and the distance between the pieces is slightly larger than the thickness of the plate 12 so as to loosely hold the plate 12.

At a boundary between the light transmitting plate holding member 20 and the light source holding member 18, stoppers 21 projecting inwardly are provided.

The reflector 14 can be easily detached from the plate 12 by a slide mechanism. The slide mechanism includes a guide rail 22 fitted to an end of the frame 15. One end of the guide rail 22 is made open so that the reflector 14 is slide along the guide rail 22.

Figure 3:
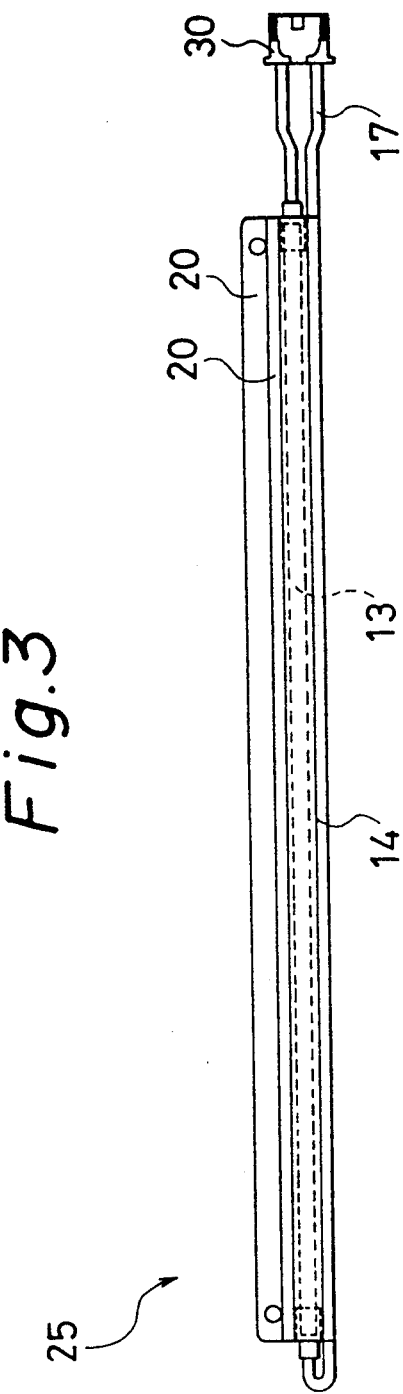
FIG. 3 is a view showing a light source unit of the LCD device.

Reference numeral 24 denotes a circuit board, and reference numeral 25 denotes a light source unit, as shown in FIG. 3, the unit 25 is made as a combination of the light source and the reflector.

In the LCD device having the above described construction, to exchange the light source 13, the reflector 14 is detached from the light transmitting plate 12 as shown in FIG. 2b. Since the slide mechanism is provided and the distance between the holding pieces of the holding member 20 is made larger than the thickness of the plate 12, the reflector 14 can be easily slide out from the plate 12. On this occasion, the lead wire 17 is kept held by the lead wire holding member 19 and is detached from the plate 12 together with the reflector 14.

Figure 4:
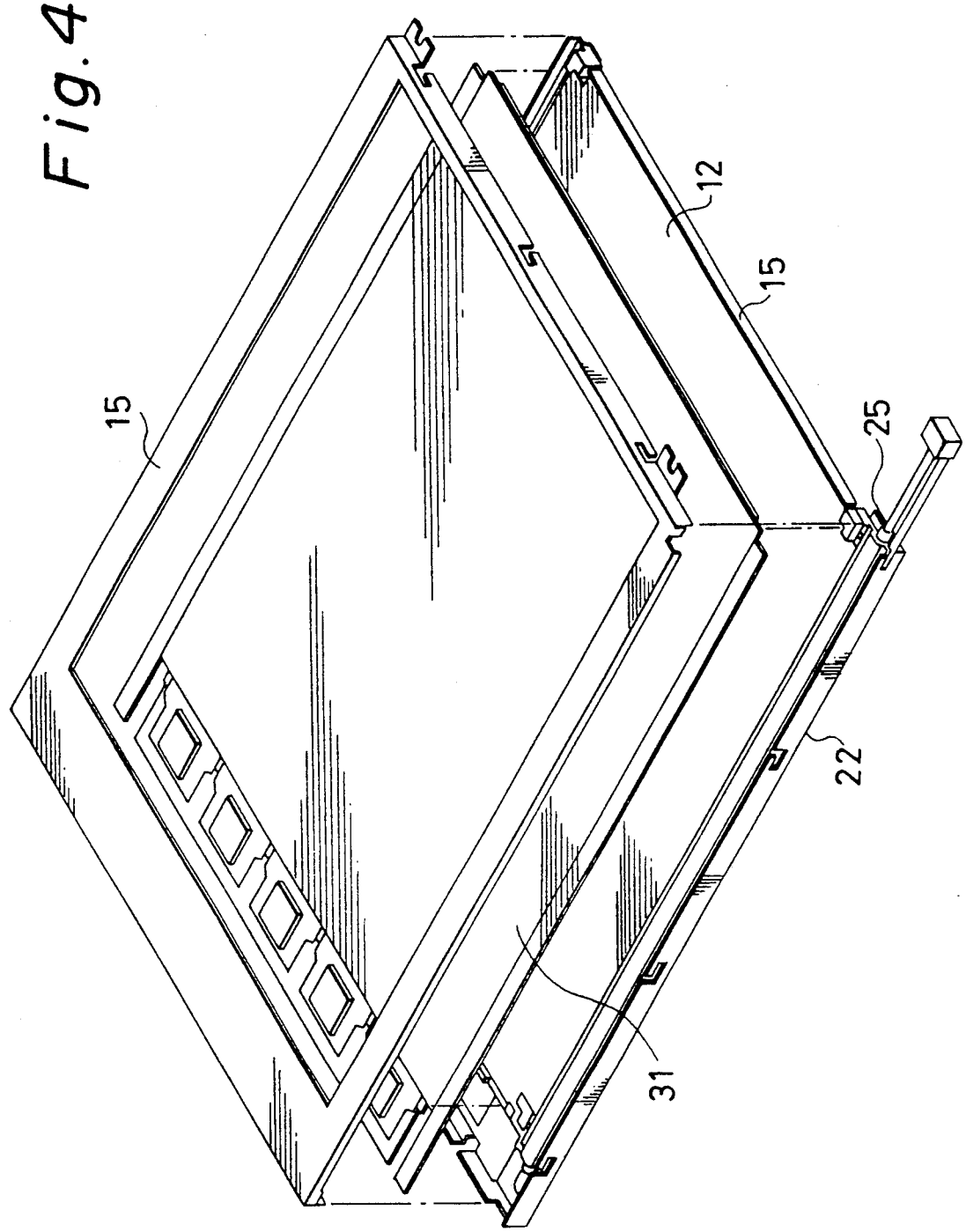
FIG. 4 is an assembly drawing of the LCD device.
Figure 5:
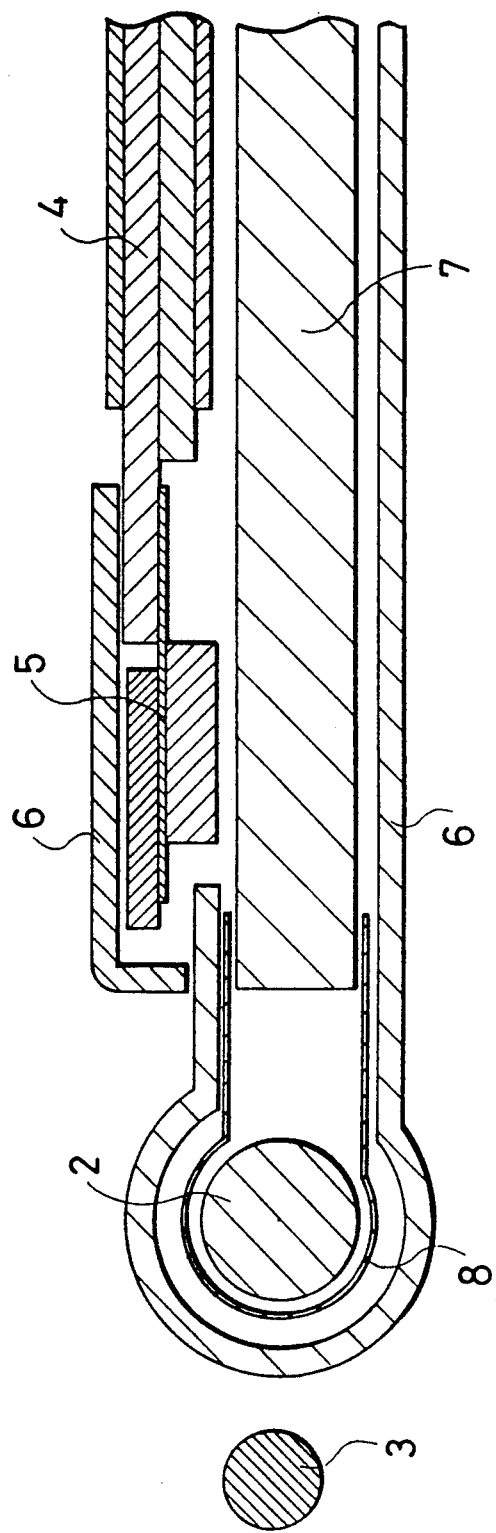
FIG. 5 is a cross-sectional view of a prior LCD device.

FIG. 4 is an assembly drawing of the LCD device. As shown in the drawing, to assemble the LCD device, a unit including the circuit board 24 and the liquid crystal element 11 is covered by upper and lower frames 15 and the light source unit 25 is slid in along the guide rail 22.

Many widely different embodiments of the present invention may be constructed without departing from the spirit and scope of the present invention. It should be understood that the present invention is not limited to the specific embodiment described in the specification, except as defined in the appended claims.

What is claimed is:

1. A liquid crystal display device with a built-in back light device for illuminating a liquid crystal element, said back light device comprising:
    a light transmitting plate disposed behind said liquid crystal element;
    a cylindrical light source disposed in the vicinity of one end of said light transmitting plate and extending along said one end;
    a reflector for reflecting light from said cylindrical light source towards said light transmitting plate, said reflector being integrated to said cylindrical light source and holding a lead wire extending along said cylindrical light source; and
    a slide mechanism for allowing said reflector to be slidably detached from said light transmitting plate, said cylindrical light source having an end to be coupled to a power source and another end to be coupled to said power source through said lead wire.

2. A liquid crystal display device according to claim 1, wherein said reflector is provided with a holding mechanism for holding said lead wire.

3. A liquid crystal display device according to claim 1, wherein said reflector is provided with a member for holding said one end of said light transmitting plate.

4. A liquid crystal display device according to claim 1, wherein said slide mechanism comprises a guide rail along which said reflector is slid out from said light transmitting plate.

5. A liquid crystal display device according to claim 1, wherein said light transmitting plate is made of acrylyl.

* * * * *